Figure 4:
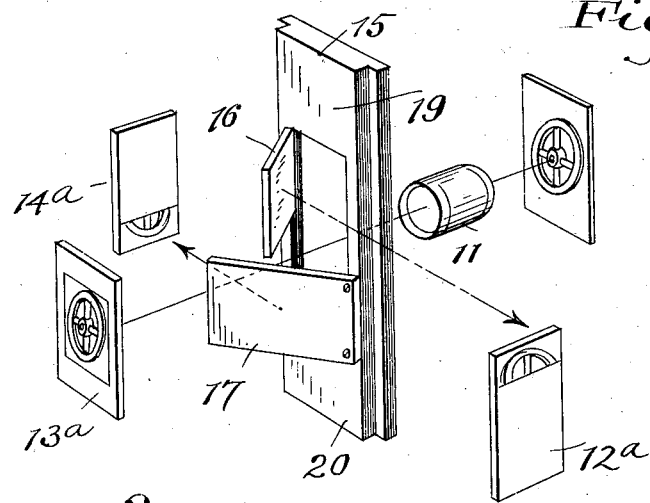

Sept. 11, 1923.

T. A. WILLARD

PHOTOGRAPHING APPARATUS

Filed June 21, 1917    2 Sheets-Sheet 1

1,467,466

Inventor:
Theodore A. Willard
By Thurston & Rivers
attys.

Sept. 11, 1923.
T. A. WILLARD
PHOTOGRAPHING APPARATUS
Filed June 21, 1917
1,467,466
2 Sheets-Sheet 2
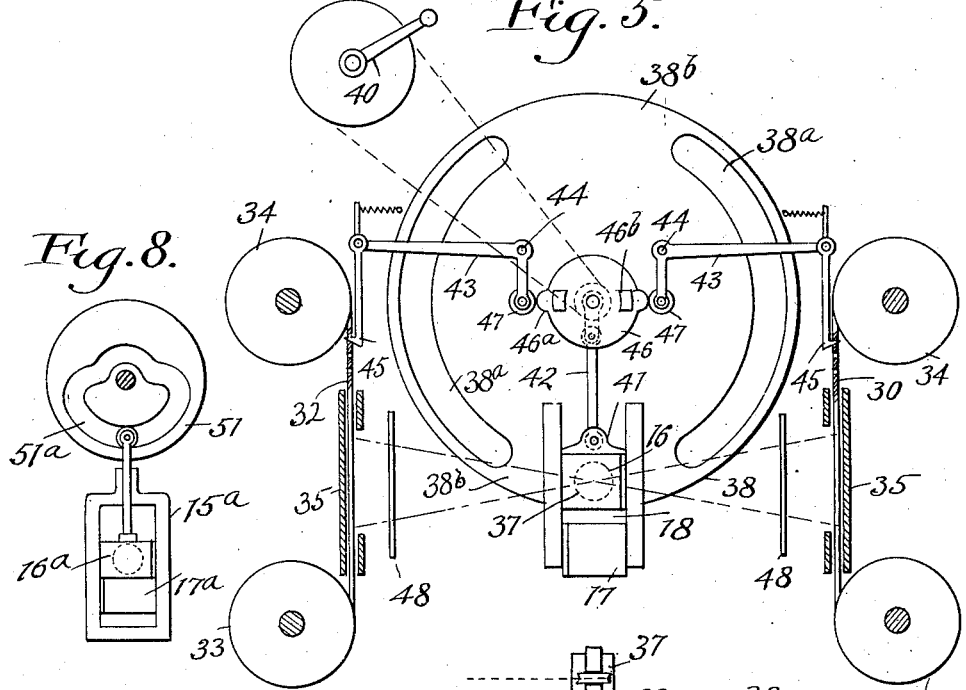
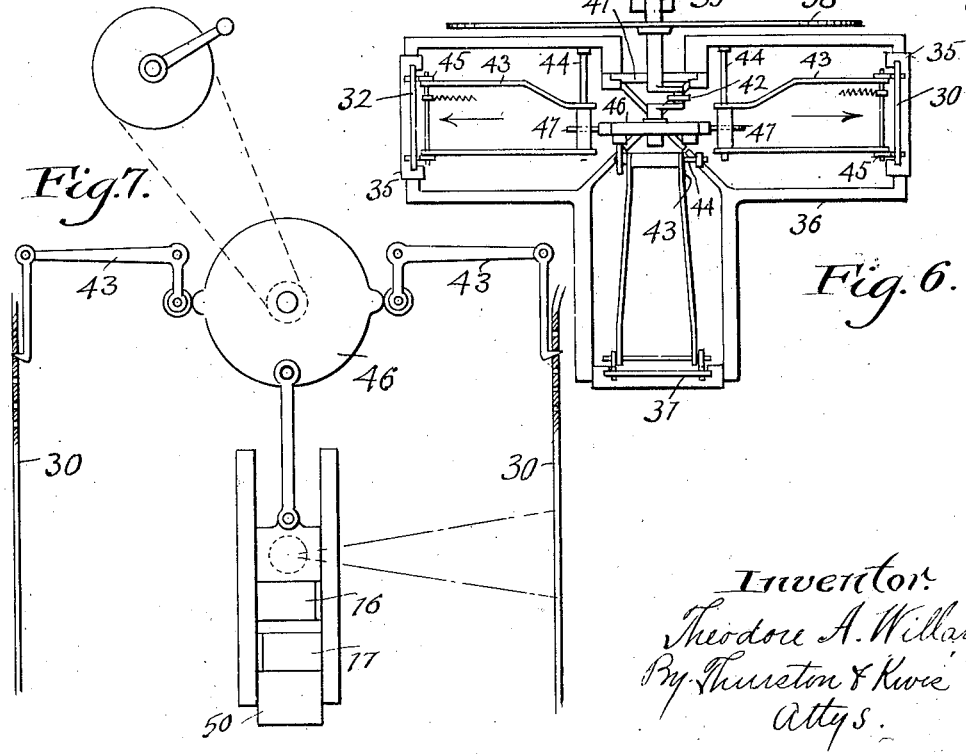

Patented Sept. 11, 1923.

1,467,466

UNITED STATES PATENT OFFICE.

THEODORE A. WILLARD, OF EAST CLEVELAND, OHIO.

PHOTOGRAPHING APPARATUS.

Application filed June 21, 1917. Serial No. 176,024.

*To all whom it may concern:*

Be it known that I, THEODORE A. WILLARD, a citizen of the United States, residing at East Cleveland, in the county of Cuyahoga and State of Ohio, have invented a certain new and useful Improvement in Photographing Apparatus, of which the following is a full, clear, and exact description.

This invention relates to a camera or photographing apparatus and has for its chief object the provision of a camera by which a series of exposures may be made on separate sensitized films or plates at substantially the same time. A further object is to accomplish this result in an efficient manner and so as to give the maximum exposure to each image or on each sensitized plate or film for a given rapidity of movement.

My invention may be utilized in the production of a plurality of negatives in monochrome or in color separations, and it may be employed in photographing stationary objects, or in the production of motion picture negatives.

In carrying out my invention I utilize a plurality of reflectors or deflectors which are successively moved before the lens or opening through which the rays are admitted, and I arrange the different sensitized members, whether films or plates, in selected positions determined by the angularity or dispositions of the reflectors so that as the latter are successively brought into light reflecting position, the different sensitized members will receive the photographic impressions in rapid succession. While the reflectors are successively brought before the lens, the exposures on different sensitized members are not made entirely in succession, for there is an overlapping and a partial coincidence of exposures as will be more fully explained.

In utilizing my invention for motion picture work the sensitized films in strip form will, of course, be utilized as is customary, and the film shifting mechanism will be operated in predetermined timed relationship with the moving reflectors, or with the latter and the shutter. A shutter separate from the carrier for the mirrors can be employed if necessary, but a separate shutter is not absolutely essential.

My invention may be further briefly summarized as consisting in certain novel details of construction and combinations and arrangements of parts which will be described in the specification and set forth in the appended claims.

In the accompanying sheets of drawings my invention is shown in its several adaptations largely in a conventional manner, or diagrammatically, practically no attempt being made to show the actual details of construction which would be employed, but rather to illustrate the principle of the invention.

Figure 2:
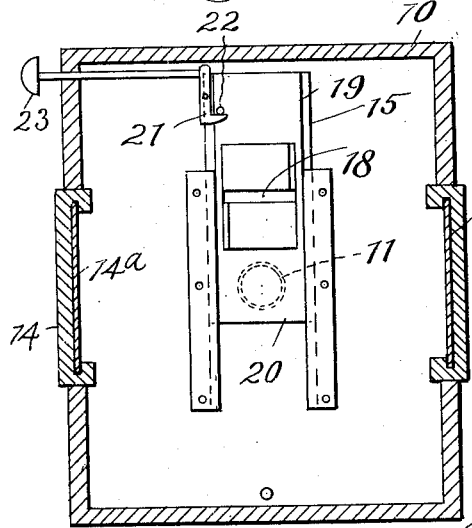
Figure 1:
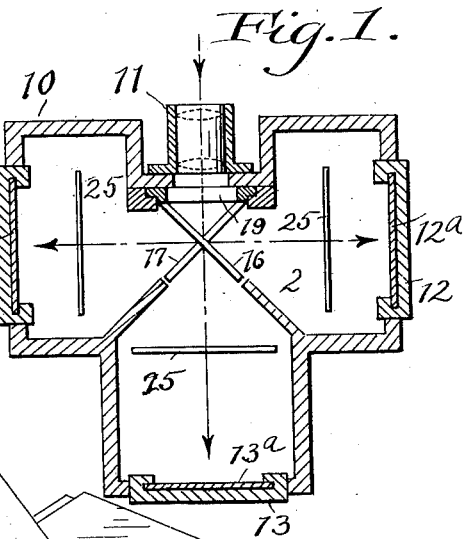
Figure 3:
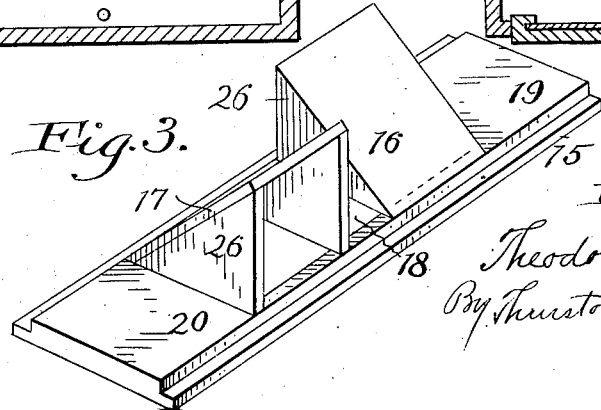

In the drawings, Fig. 1 is a horizontal sectional view through a camera wherein three separate exposures are made on sensitized plates by means of the shifting reflectors; Fig. 2 is a vertical sectional view looking toward the inner front side of the camera and showing particularly the vertically movable slide carrying the reflectors which are adapted to reflect the light rays successively to opposite sides, first to one side and then the other of the camera box with an open space between the reflectors so that the light from the lens may pass directly through to the rear of the box and cause the exposure on a third plate; Fig. 3 is a perspective view of the slide with the reflectors; Fig. 4 is a purely diagrammatic view illustrating the manner in which an object is photographed on three sensitized plates or films as the case may be, to an extent successively, but in part simultaneously due to the overlapping of the images on the sensitized surfaces; Fig. 5 is a somewhat diagrammatic view illustrating the manner in which my invention may be applied for motion picture photography, this view being a vertical sectional view looking from the rear toward the front wall of the camera and showing how the exposures are made on the two laterally disposed films; Fig. 6 is a horizontal sectional view to illustrate in addition to the laterally disposed films, the film at the rear of the camera which receives its light direct from the lens; Fig. 7 is a view similar to Fig. 5, but showing a construction wherein the rotary shutter may be eliminated; Fig. 8 is a detail view showing a modification in the reflector shifting means.

Referring first to Figs. 1 to 4 inclusive, wherein I have shown my invention applied to an ordinary camera in distinction to a motion picture camera, 10 represents the camera box which may be of any suitable construction, this box having a lens holder 11 equipped with a suitable lens. At the two sides and at the rear of the camera box 10 are three holders 12, 13 and 14, adapted to receive sensitized plates or films $12^a$, $13^a$ and $14^a$. In order that the rays of light entering the box through the lens in the holder 11 may be diverted to the two side plates or films (hereafter termed "plates" for convenience) and also allowed to pass directly back to the rear plate so as to produce separate and independent exposures, I provide immediately back of the lens holder, a carrier for suitable reflectors. In this case the carrier is in the form of a vertically movable slide 15, which in this case is moved downward by gravity, and on this slide I provide two reflectors 16 and 17 which are designed to divert the light rays at right angles to the right and to the left respectively, there being an open space designated 18 between the reflectors through which space the light may pass directly to the rear plate. The slide has an opening (see particularly Figs. 1 and 4) so that the light may pass therethrough onto the reflectors, or through the space 18. Above the uppermost reflector, and below the lowermost reflector are opaque portions 19 and 20 which act as shutters when the slide is either in its uppermost position or lowermost position.

A shown, particularly in Fig. 2, the slide is designed to be released so as to drop by gravity. As here shown, it is retained in its uppermost position by a pivoted latch 21, designed to engage a suitable pin or other projection 22 on the slide, and adapted to be released by a button 23 which is on the exterior of the camera box and is connected by a rod to the latch so as to rock the same. When the slide is in its upper position, the lower opaque part 20 closes the lens, and when the slide is released it falls, and the lowermost reflector 17, the open space 18, and then the upper reflector 16 are successively brought before the lens opening which is indicated by the dotted circle. As the slide drops, the rays of light are first deflected by the reflector 17 to the left plate, then the light passes through the opening or slot 18 between the reflectors onto the rear plate $13^a$, and then the light strikes the upper reflector and is deflected to the right plate $12^a$, thus producing in rapid succession three successive exposures, or three exposures on three separate sensitized members.

In Fig. 4 I have shown diagrammatically, the manner in which the exposures are made, the slide being shown in its central or mid position, that is, half way between its uppermost and lowermost positions, in which position the rear plate is receiving the full image or full exposure while the image is just leaving plate $14^a$ and appearing on plate $12^a$. To this extent there is the overlapping of the images or exposures as stated previously.

The separate negatives may be made in monochrome as before stated, or in color separations, in which latter event, color filters, shown at 25 are arranged between the reflectors or the space 18 and the plates, these color filters being indicated diagrammatically in Fig. 1.

For the reflectors I may employ mirrors or prisms whichever prove to be the most efficient in any particular case. I prefer to use thin glass ground and polished to a perfect surface and silvered on the face so that the reflection comes from the surface instead of through the glass.

The reflectors are preferably of a length, laterally considered, equal at least, and preferably somewhat greater than the diameter of the lens. The width of the reflectors may be varied. They may be of substantial width or in the form of narrow bands, the width depending largely upon the amount or time of exposure desired, and upon the rate of movement of the slide. For extremely rapid or sensitive films or plates, with a given rate of movement of the slide, the reflectors may be very narrow, in which event they act in a measure like curtain shutters giving each image its maximum exposure.

While the reflectors may be otherwise arranged and shifted in different ways than here shown, the arrangement on a slide adapted to be given a continuous rectilinear movement has certain advantages over other arrangements and other movements, especially as the overlapping feature referred to, is obtained, and generally greater speed is obtainable than in a construction wherein the reflectors must be started and stopped for each particular or separate exposure or negative.

It will be observed that in Fig. 3 the reflectors have covered ends 26, these being employed when it is necessary to keep out stray rays of light.

Instead of having a single lens at the front of the camera, I may employ a light opening at the front of the camera and use a plurality of lenses inside the camera box, one for each film or plate, these lenses being arranged so that the light will pass through the lenses successively as it is reflected to the right or left by the reflectors, or passes through the slot between the reflectors. This arrangement has no particular advantages over the arrangement utilizing a single lens or a set of lens at the front of the camera, but it will nevertheless produce good results.

In Figs. 5, 6 and 7 I have shown how my invention may be utilized for motion picture photography. In this case, the camera includes three films, 30, 31 and 32 which are designed to be unwound from suitable reels 33, and wound onto receiving reels 34, the films in passing from the feed reels to the receiving reels extending through guides 35 having suitable openings to receive light rays. Any suitable, or any of the well known devices for feeding the films intermittently may be employed, the particular mechanism here shown for this purpose being simply a conventional representation of an intermittent film moving means which operates synchronously with respect to a carrier for the reflectors and a rotary shutter, assuming that the latter is employed.

In Fig. 6 the three films are shown enclosed in a camera box designated 36, the film 31 being at the rear of the box, and the films 30 and 32 at the two sides. At the front of the camera box is a lens holder 37 (see Fig. 6 and Fig. 5 where the lens holder is shown by dotted lines). In Figs. 5 and 6 there is a rotary shutter 38 having arc-shaped openings 38ª, and opaque or closed portions 38ᵇ between the openings. The shutter is in this case mounted on a shaft 39 which may be rotated in any suitable manner such as by means of a crank 40 (Fig. 5) which can be geared to the shaft 39. This shaft when rotated operates in predetermined time relationship the film feeding means, the shutter and the slide here designated 41 which is on the interior of the box behind the lens holder, and as in the prior instance, is designed to be moved vertically so as to bring successively before the lens holder the two reflectors and slot designated as in Figs. 1 to 4, by the reference characters 16, 17 and 18. In this case the shaft 39 operates the slide by a crank motion, the slide being connected by a rod 42 to the crank on the shaft.

For the purpose of intermittently feeding the three films I have here shown three bell-cranks 43, pivoted at 44 to suitable portions of the camera box and provided at their outer ends with dogs 45 which engage in perforations along the margins of the films, and when moved upwardly, move the films in the same direction a predetermined amount. The bell-cranks are rocked so as to shift the dogs upwardly by a disk 46 having lugs 46ª and 46ᵇ, and adapted to be engaged by rollers 47 on the bell-crank arms. The lugs 46 are on the periphery of the disk and are adapted to engage the rollers carried by the bell-cranks which shift the two side films 30 and 32, while the lugs 46ᵇ are here shown on the front face of the disk and are adapted to engage the rollers of the bell-crank which shifts the rear film 31. The films will be shifted in this case at each half revolution of the disk 46, or shaft 39, and they will be shifted when the rotary shutter closes the lens and at a time when the slide is at or about one end of its movement.

The parts are so organized and connected that immediately after the shifting of the films, one of the slots 38ª of the shutter comes opposite the lens holder, and at or about this time the slide starts on one of its vertical movements (as shown in Fig. 5, its upward movement) and is rapidly moved so as to bring the two reflectors and open slot opposite the lens opening, causing the exposures to be made onto the three films, the films being stationary, of course, while these exposures are being made. Immediately after this occurs, the shutter closes the lens, the films are again shifted, then the shutter is again opened and the slide is moved downward, again causing exposures on the three films.

Thus it will be seen that I have provided connected mechanism which operates in predetermined relationship the three films, the slide and the shutter so as to produce in the interim between each film movement three separate substantially simultaneously made exposures.

These negatives can be in monochrome, but preferably they will be in color separations, in which event color filters, indicated conventionally at 48, will be utilized between the reflectors and slot 18 and the three films.

If desired, the rotary shutter may be eliminated, and the shutter or shutters provided or formed on the slide, in which event the slide will be provided at its ends, above and below the reflectors 16 and 17, with opaque portions designated 50 in Fig. 7, these portions being opposite the lens holder at the instant that the films are shifted.

With the rotary shutter shown in Fig. 5, it will be obvious that a shorter movement of the slide is required than is the case when the shutter is eliminated and the shutter is formed as a part of the slide.

The invention as here shown and above described, is susceptible of numerous modifications and amplifications, some of which will be readily suggested when the main features of the invention are understood. For example, if it is desired to shorten still further the slide movement, the slot between the reflectors can be eliminated and one of the reflectors can be transparent so that it may be used both as a reflector to reflect part of the light to one of the films at the side of the box, and to allow part of the light to pass directly through the same onto the film or plate at the rear of the camera, or directly behind the lens. While the light which is reflected by the transparent reflector in proportion to that going through to the back plate or film is quite small, it is enough to produce the yellow or most rapid printing negative.

Furthermore, the red or green filters may be placed on the back of the transparent reflector instead of placing it at a distance therefrom, so that the combination can perform the two functions of causing the reflection of the proper rays of light to produce a certain color negative and the transmission of the rays of the other color.

Furthermore, instead of giving the slide or carriage for the reflectors a continuous or uninterrupted movement from one end of the stroke to the other, the carrier may be given an intermittent movement so that the reflectors will be substantially stationary while reflecting the light to make the negatives. This can be accomplished by means of a cam movement instead of a crank movement, as shown in Fig. 8, wherein the slide designated 15$^a$ is shown actuated by a disk 51 with a cam slot 51$^a$ so formed as to hold the slide stationary when the exposures are being made, and to quickly move the same between the periods of light reflection so as to bring first one and then the other reflector before the lens. In this figure I have shown two reflectors 16$^a$ and 17$^a$ arranged side by side with no slot between them as in the prior instances. This can be utilized in making two negatives, or three negatives, in which event one of the reflectors will be transparent so as to transmit part of the light to one negative and to reflect a part of the light to another negative as described above.

Further changes or additions may suggest themselves to one skilled in the art, and I therefore aim in my claims to cover all modifications which do not involve a departure from the spirit and scope of my invention.

Having thus described my invention, what I claim, is:

1. In a camera, a casing, having an opening for rays of light, said casing being adapted to receive a plurality of films, means for moving the films intermittently, a carrier having reflecting means and adapted to be interposed in the path of the light rays so as to cause the rays to be directed onto the different films when the films are stationary, and means for moving the said carrier intermittently so that the carrier is stationary when transmitting light from the reflecting means to the films.

2. In a camera, a casing having an opening for rays of light, said casing being adapted to receive a plurality of films, means for moving the films intermittently, a reciprocating carrier having reflecting means and adapted to be interposed in the path of the light rays when the films are stationary to cause the rays to be directed to the different films, means for moving the said carrier intermittently so that the carrier is stationary during the period when light is being reflected to the films.

3. In a camera, a casing having an opening for rays of light, said casing being adapted to receive a plurality of films, means for moving the films intermittently, a carrier having reflecting means which are adapted to be interposed in the path of the light rays when the films are stationary, thereby to cause the rays to be directed onto the different films, cam member for operating the said carrier, means for moving said cam with a continuous motion, said cam being constructed so that the carrier is stationary during the time that the reflecting means reflects light to the films.

4. In a camera, a casing having an opening for rays of light and adapted to receive a plurality of films, means for moving the films intermittently, a carrier having reflecting means adapted to be interposed in the path of the light rays when the films are stationary, thereby to cause the rays to be directed onto the different films, a cam member formed with a cam groove, means engaging the cam groove and the carrier whereby the carrier is moved intermittently and so that the carrier is stationary when the light rays are being reflected to the film.

5. In a camera, a casing having an opening for rays of light, said casing being adapted to receive a plurality of films, means for moving the films intermittently, a carrier having reflecting means and adapted to be interposed in the path of the light rays when the films are stationary, thereby to cause the rays to be directed onto the different films, means for moving the said carrier intermittently so that the carrier is stationary when transmitting light from the reflecting means to the films, and means for moving the carrier operating means and the film operating means in predetermined timed relationship.

6. In a camera, a casing having an opening for rays of light, said casing being adapted to receive a plurality of films, means for moving the films intermittently, a carrier having reflecting means and adapted to be interposed in the path of the light rays when the films are stationary, thereby to cause the rays to be directed to the different films, a cam member for operating the said carrier intermittently so that the carrier is stationary when the rays are directed from the reflecting means to the films, and means associated with the cam member for operating the film moving means, whereby the films and the carrier are moved in predetermined timed relationship.

In testimony whereof, I hereunto affix my signature.

THEODORE A. WILLARD.